J. W. BURRIS.
Seed-Planter.
No. 197,092. Patented Nov. 13, 1877.
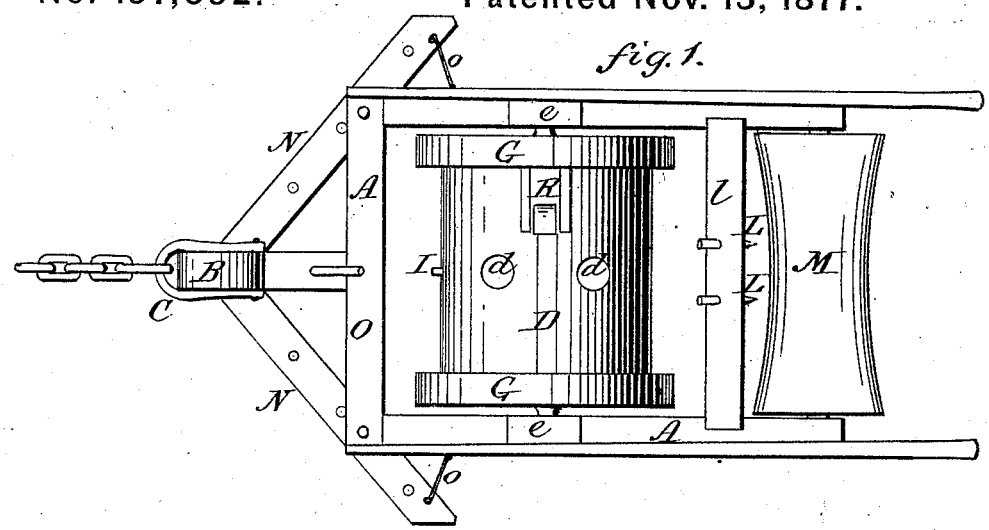
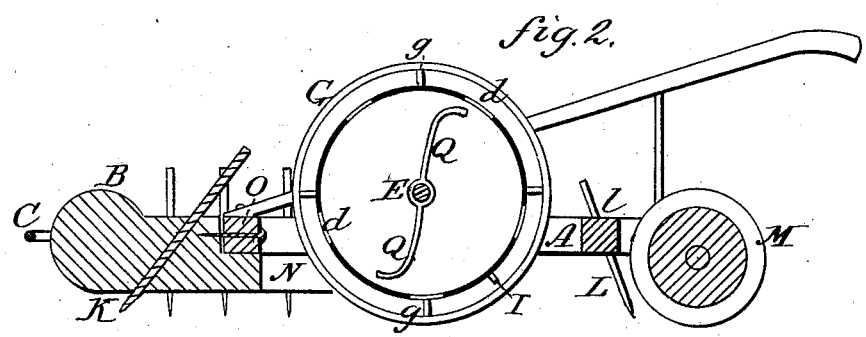
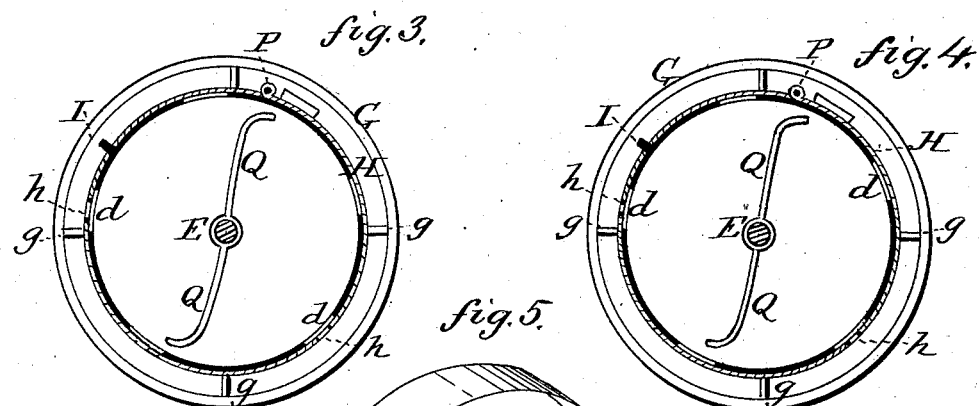
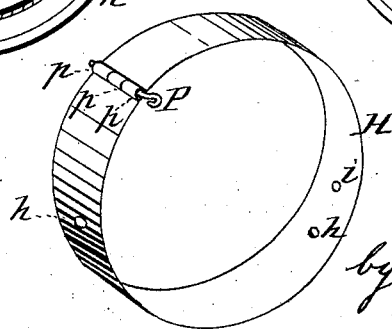
Witnesses:
N. P. Cowl
L. Bacon
Inventor:
John W. Burris,
by Johnson & Johnson
Attys.

UNITED STATES PATENT OFFICE.

JOHN W. BURRIS, OF MARSHALL, TEXAS, ASSIGNOR OF ONE-HALF HIS RIGHT TO JOHN J. HANNENSTINE, OF SAME PLACE.

IMPROVEMENT IN SEED-PLANTERS.

Specification forming part of Letters Patent No. 197,092, dated November 13, 1877; application filed September 18, 1877.

*To all whom it may concern:*

Be it known that I, JOHN W. BURRIS, of Marshall, in the county of Harrison and State of Texas, have invented certain new and useful Improvements in Seed-Planters; and I do hereby declare that the following is a full, clear, and exact description thereof, which will enable others skilled in the art to which it appertains to make and use the same, reference being had to the accompanying drawing, and to letters of reference marked thereon, which form a part of this specification.

My invention relates to revolving-cylinder seed-planters; and its object is to furnish a strong and durable implement adapted to plant with precision various kinds of seed, and the wheels of which are not liable to become clogged with earth.

The devices and combinations thereof which I employ in accomplishing this object will be hereinafter fully described with reference to the drawing, in which—

Figure 1 is a top view, and Fig. 2 a vertical longitudinal section, of my implement arranged for planting cotton. Fig. 3 is a cross-section of cylinder adapted to plant corn. Fig. 4 is a similar view, the cylinder arranged to plant pease; and Fig. 5, one of the perforated detachable bands of the seed-cylinder.

The frame A is rectangular in form, and has a forward projection, B, to which is attached the clevis or hitching-loop C. The seed-cylinder D is mounted so as to turn loosely upon a shaft, E, which has its fixed bearings at $e\ e$, in opposite side timbers of the frame A.

Around the middle of the seed-cylinder D is a row of seed-dropping apertures, $d\ d$, &c., and near the ends of said cylinder short spokes $g$ project therefrom, and support rims or tires G, upon which the implement travels.

The traveling-wheels used in this class of implements have, as I believe, been heretofore solid wooden disks, and have had the cylinder supported between them; but these disks were subject to warp, and in the angle formed by the surface of the cylinder and the projecting portion of said wheel the earth would become clogged, thus impeding the progress of the implement. In the construction which I show there is neither of these disadvantages.

H is a metal band, which fits around the middle of the seed-cylinder D, and is provided with perforations $h$, and also a small hole, $i$, through which projects a locking-pin, I, from the surface of the seed-cylinder, which pin prevents the band from slipping. The ends of band H are fastened together by the pin P, passing through eyes $p\ p\ p$ on said ends, as shown in Fig. 5.

The perforations $h$ in the band H coincide with certain apertures $d$ in the seed-cylinder, but are smaller; and the portion of the band H which is not perforated serves to close certain of said seed-dropping apertures $d$. The band H, as shown in the drawing, may be replaced by another band having either more or fewer, larger or smaller, perforations.

If the implement were to be used for planting cotton, which is planted in hills close together, the band H would be removed from the cylinder, and all of the seed-dropping apertures $d$ left open, so that as the implement progressed and the cylinder revolved, portions of cotton-seed would be dropped from each aperture $d$ as it was brought nearest to the ground, said seed falling in a furrow made by the opener K, which is arranged in front of frame A, and would be covered by the coverers L L, arranged in a cross-beam, $l$, in rear of the cylinder, and would have the earth closely pressed upon them by the roller M, which is journaled at the rear end of frame A.

If it were desired to plant corn, around the cylinder would be placed a band having perforations considerably smaller than the cotton-seed apertures, and about three feet apart.

If pease were to be planted, a band having still smaller perforations would be used, and the said perforations would be placed at such distance apart as the hills were desired to be.

If the circumference of the cylinder should be just equal to the distance required between seed-hills, then, of course, a band would be required having but one perforation for seed; but if said circumference were equal to twice the distance required between hills, a band with two perforations would be required, and so on.

In front of the frame A are two harrow-beams, N, secured to the forward projection O of frame A, and inclined outward and rearward, so that said beams, respectively, pass directly under the front corners of the frame A, and their ends project somewhat to the rear thereof, and are firmly braced by rods $o\ o$, connected to said ends and to the side timbers of frame A. These harrow-beams perform an important function in leveling and preparing the ground for receiving the seed.

It will be understood that the seed-dropping cylinder is provided in its interior with suitable seed-agitators Q, fixed upon the shaft E, and not revolving. By having the cylinder revolve and the stirrers fixed, I find the dropping of the seed is more certain and uniform. The cylinder is supplied through the slide R.

In using the replaceable differently-perforated bands in connection with a hollow rolling hopper having perforations adapted for planting cotton-seed, I obtain the advantage of using the rolling hopper without a perforated band for planting such seed, and then of using separate bands, with different perforations, for planting corn and for pease. The rolling hopper for this purpose has a locking-pin, and the several bands a locking-hole, fitting over said pin, so as to bring the perforations in the bands coincident with the cylinder perforations. By this construction and adaptation I avoid the objection of the binding of the band to the surface of the cylinder when arranged as a permanent part of the cylinder between circumferential guides, or when slotted and adapted to be adjusted over a clamp-screw, as heretofore devised, because such fixed bands will become hard-bound and rusted with wet, and thus make it difficult, if not impossible, to adjust them to vary the size of the planting-apertures; but with the locking-pin device of the cylinder, and a simple draw-pin for uniting the eyed ends of the differently-perforated bands, I can quickly apply and remove said differently-perforated bands or use the cylinder without them.

I claim—

1. The combination, with a rolling perforated seed-dropping hopper adapted for planting cotton-seed, of replaceable differently-perforated bands adapted to the hopper-apertures, for planting corn or pease, as herein set forth.

2. The rolling perforated seed-dropping hopper having the locking-pin I, in combination with replaceable differently-perforated bands H, having each a locking pin-hole, I, matching eyed ends $p$, and a fastening draw-pin, P, substantially as herein set forth.

In testimony that I claim the foregoing I have affixed my signature in the presence of two witnesses.

JOHN WILLIAM BURRIS.

Witnesses:
R. C. GARRETT,
L. H. JOHNSON.